United States Patent [19]

Weingold et al.

[11] Patent Number: 5,088,892
[45] Date of Patent: Feb. 18, 1992

[54] BOWED AIRFOIL FOR THE COMPRESSION SECTION OF A ROTARY MACHINE

[75] Inventors: Harris D. Weingold, West Hartford; Robert J. Neubert, Amston; John G. Andy, Hamden; Roy F. Behlke, Manchester; Glen E. Potter, Vernon, all of Conn.

[73] Assignee: United Technologies Corporation, Hartford, Conn.

[21] Appl. No.: 476,921

[22] Filed: Feb. 7, 1990

[51] Int. Cl.$^5$ ............................................. F01D 9/00
[52] U.S. Cl. .................................. 415/193; 415/199.4; 415/914
[58] Field of Search ............ 415/191, 192, 193, 199.4, 415/914

[56] References Cited

U.S. PATENT DOCUMENTS

| | | | |
|---|---|---|---|
| 2,154,313 | 4/1939 | McMahan | 230/274 |
| 2,355,413 | 8/1944 | Bloomberg | 253/77 |
| 2,570,155 | 10/1951 | Redding | 138/38 |
| 2,663,493 | 12/1953 | Keast | 230/122 |
| 2,795,373 | 6/1957 | Hewson | 230/132 |
| 2,801,790 | 8/1957 | Doll, Jr. | 415/192 |
| 4,371,311 | 2/1983 | Walsh | 415/182 |
| 4,431,376 | 2/1984 | Lubenstein et al. | 416/223 |
| 4,504,189 | 3/1985 | Lings | 415/115 |
| 4,714,407 | 12/1987 | Cox et al. | 415/192 |
| 4,741,667 | 5/1988 | Price et al. | 415/191 |
| 4,826,400 | 5/1989 | Gregory | 415/181 |

FOREIGN PATENT DOCUMENTS

| | | |
|---|---|---|
| 54-45405 | 10/1979 | Japan. |
| 344800 | 4/1950 | Switzerland. |
| 27409 | of 1906 | United Kingdom ............ 415/191 |

OTHER PUBLICATIONS

Compressors For Advanced Turboshaft Engines–S. Baghdadi.

Primary Examiner—Edward K. Look
Assistant Examiner—Hoang Nguyen
Attorney, Agent, or Firm—Gene D. Fleischhauer

[57] ABSTRACT

An airfoil for a compression section 12 of a rotary machine 10 is disclosed. Various construction details are developed to increase the efficiency of the compression section 12. In one detailed embodiment, the airfoil has a spanwise axis 52 or stacking line which extends in a generally radial direction. The stacking line or spanwise axis 52 is straight over the mid-section of the airfoil and is angled circumferentially toward the radial direction in the end wall regions 58, 66 of the airfoil.

12 Claims, 4 Drawing Sheets

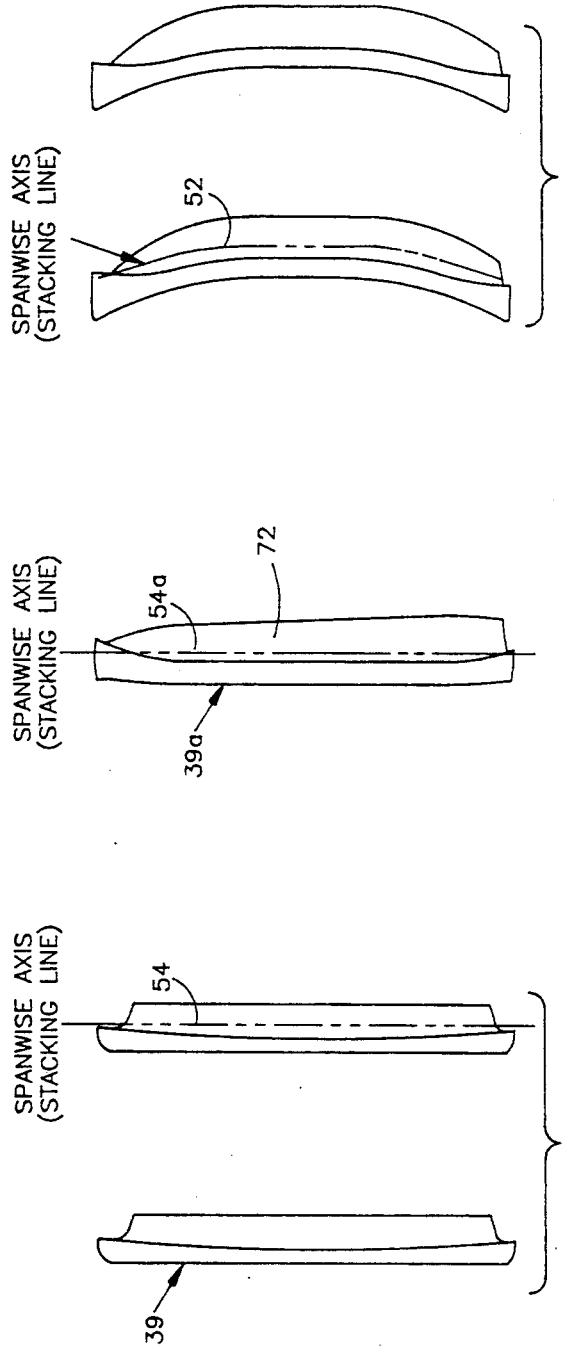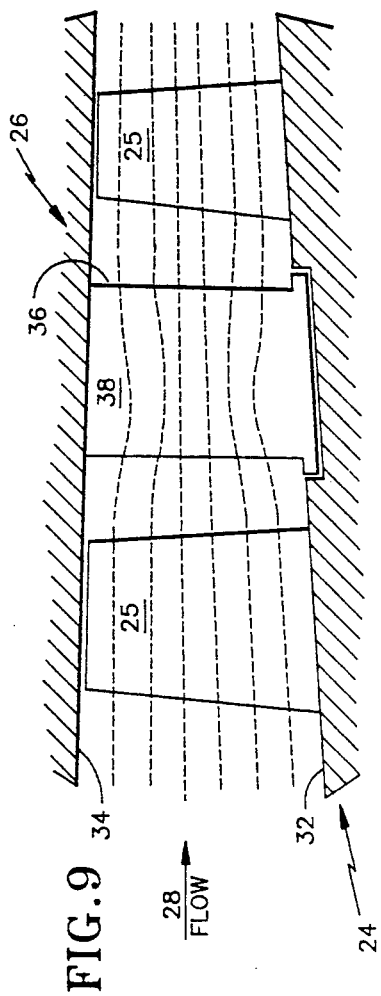

BOWED AIRFOIL FOR THE COMPRESSION SECTION OF A ROTARY MACHINE

DESCRIPTION

1. Technical Field

This invention relates to rotary machines having compression sections and particularly to airfoils for use in a compression section which extends axially in the machine. The compression section is commonly referred to as the compressor or the compressors of the machine.

2. Background of Invention

A gas turbine engine is one example of a rotary machine having an axially extending compression section which is disposed about an axis R of the engine. The gas turbine engine has a combustion section and a turbine section downstream of the compression section which are also disposed about the axis R. An annular flowpath for working medium gases extends axially through the sections of the engine.

The working medium gases are compressed and diffused in the compression section. Fuel is mixed with the working medium gases in the combustion section and burned to add energy to the gases. The hot, pressurized gases are expanded through the turbine section to develop propulsive thrust and, through one or more turbines, to extract energy from the gases by driving the turbines about the axis of the engine.

Components of the compression section are rotatably attached to the turbines by a rotor shaft. As each turbine is driven about the axis R by the expanding working medium gases, the turbine drives rotating components in the compression section about the axis. These rotating components in the compression section do work on the incoming gases to pressurize the gases.

In a turbofan gas turbine engine, the compression section may have three compressors in axial alignment for increasing the pressure of the incoming gases. The compressors are commonly referred as the fan compressor, the low pressure compressor, and the high pressure compressor.

Each compressor has an outer wall and an inner wall which bound the working medium flowpath. The rotating components include arrays of rotor blades which extend outwardly across the working medium flowpath into proximity with the outer wall. Alternating with the arrays of rotor blades are arrays of compressor vanes. Each compressor vane has an airfoil which extends radially inward across the flowpath working medium gases. The airfoils adjust the angular velocity components of the working medium gases as the gases exit the rotor stages and prior to entering the adjacent rotor stage or a diffuser region of the compressor.

One example of an array of airfoils of this type is shown in U.S. Pat. No. 2,795,373 issued to Hewson entitled "Guide Vane Assemblies In Annular Fluid Ducts". The airfoils of Hewson are disposed in a diffuser region of the compressor.

Each airfoil has a leading edge and a trailing edge. Aerodynamic surfaces extend from the leading edge to the trailing edge. The aerodynamic surfaces are a suction side surface on one side which is commonly referred to as the suction surface and a pressure side surface on the other side which is commonly referred to as the pressure surface. A spanwisely extending axis (spanwise axis or stacking line) and a plurality of chordwisely extending airfoil sections disposed about the axis form the shape of the airfoil surfaces. The spanwise axis passes through the center of gravity of each airfoil section to locate the airfoil sections with respect to each other.

Hewson shows airfoils having a spanwise axis (stacking line) which is either curved (FIG. 6) or formed of two spanwisely extending parts which are straight and which intersect at the mid-span region of the airfoil (FIG. 3). According to Hewson, this redistributes the total pressure head in the gas flow to correct for boundary layer losses on the upstream side of the assembly and avoid maldistribution in the total pressure head.

The above art notwithstanding, scientists and engineers working under the direction of Applicant's assignee have sought to develop airfoils which reduce aerodynamic losses in airfoil regions adjacent the walls which bound the flowpath for working medium gases (commonly referred to as the end wall regions) and which reduce the impact of contouring the airfoil on the weight of the airfoil.

SUMMARY OF INVENTION

This invention is in part predicated on the recognition that either angling the mid-span region of the airfoil may adversely increase the loading across the airfoil and decrease the performance of the airfoil in comparison with airfoils which are radial across the spanwise extent of the airfoil.

According to the present invention, an airfoil of an annular compression section of a rotary machine has a spanwise axis or stacking line which extends in a generally radial direction, the spanwise axis being straight and parallel to the radial direction over the midspan region of the airfoil and being straight and angled circumferentially toward the radial direction in the end wall regions to form a bowed airfoil having a pressure surface which faces the adjacent wall in each end wall region of the airfoil.

In accordance with one embodiment of the present invention, the airfoil is formed of a plurality of airfoil sections having an inlet metal angle in the end wall regions which is smaller than the inlet metal angle of a reference airfoil having the same family of airfoil sections and extending in a radial direction over its entire spanwise length.

A primary feature of the present invention is an airfoil of a compressor section of a rotary machine having an airfoil and a spanwise axis (stacking line) which is straight over the midspan region of the airfoil. Another feature is the end wall regions of the airfoil in which the airfoil and the spanwise axis are angled circumferentially with respect to the radial direction to form a bowed airfoil. The airfoil has a pressure surface which faces the adjacent wall in each end wall region of the airfoil. In one particular embodiment, a feature is an inlet metal angle in the end wall region which is smaller than an inlet metal angle for a corresponding radial airfoil having the same family of airfoil sections.

A primary advantage of the present invention is increased compressor efficiency which results from shifting the upstream flow of working medium gases approaching the array of airfoils away from each end wall and toward the midspan region of each airfoil. Another advantage is the efficiency of the compressor which results from shifting the downstream flow back toward the original radial distribution which existed prior to the flow entering the next array of rotor blades. Another advantage is the reduced mass of the airfoil which results from having a straight section in the midspan region of the airfoil in comparison with airfoils which are curved over the entire length or angled over the entire length.

The foregoing and other features and advantages of the present invention will become more apparent in the light of the following detailed description of preferred embodiments thereof as discussed and illustrated in the accompanying drawings.

BRIEF DESCRIPTION OF DRAWINGS

FIG. 6 is a view from upstream in a chordwise direction of two adjacent radially extending airfoils of the type found in the prior art having a radially extending midspan section and two radially extending end wall sections;

FIG. 6a is a front view of radially extending reference airfoil having a family of reference airfoil sections;

FIG. 8 is a view of two airfoils of the present invention taken from a perspective which is similar to the view of the airfoil shown in FIG. 6a;

FIG. 9 is a schematic representation of a portion of a compressor of a rotary machine showing the effect of airfoils of the present invention on the flow of working medium gases through the machine.

BEST MODE FOR CARRYING OUT INVENTION

Figure 1:
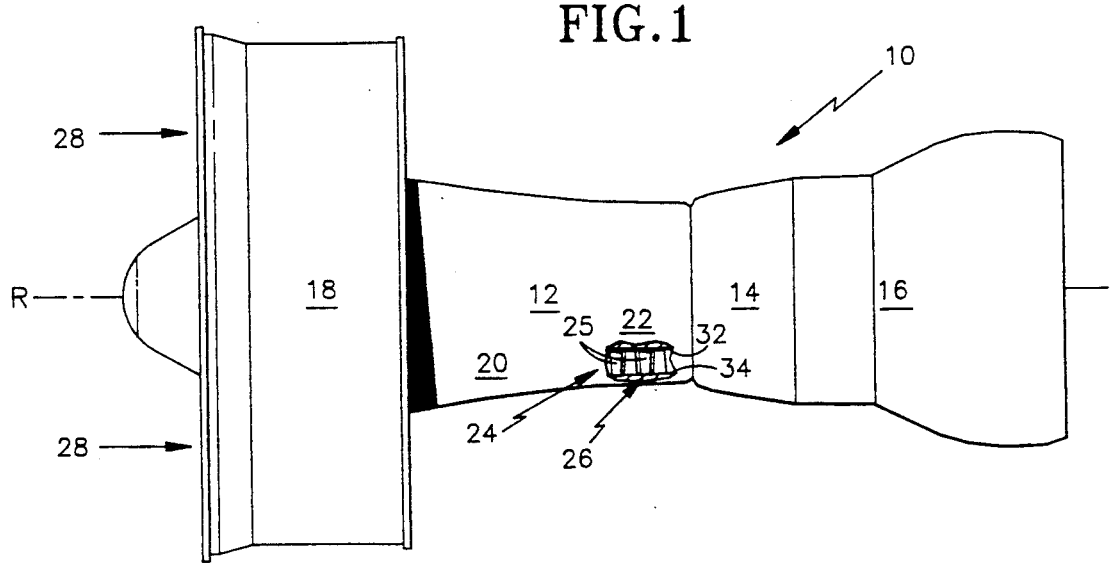
FIG. 1 is a simplified, side-elevation view of a turbofan gas turbine engine with the outer case broken away to show a portion of the rotor and stator assemblies in one of the compressor sections of the engine.

A turbofan gas turbine engine embodiment 10 of the present invention is illustrated in FIG. 1. The principal sections of the engine are a compression section 12, a combustion section 14, and turbine section 16. The compression section includes a fan compressor 18, a low pressure compressor 20, and a high pressure compressor 22. The engine has an axis R.

Rotor assemblies, as represented by the rotor assembly 24 having rotor blade 25, extend axially through the compression section 12 and the turbine section 16. A stator assembly 26 circumscribes the rotor assemblies. An annular flowpath 28 for working medium gases extends axially through the compressor section and is bounded by portions of the stator assembly and the rotor assembly which form an inner wall 32 and an outer wall 34 for the annular flowpath.

Figure 2:
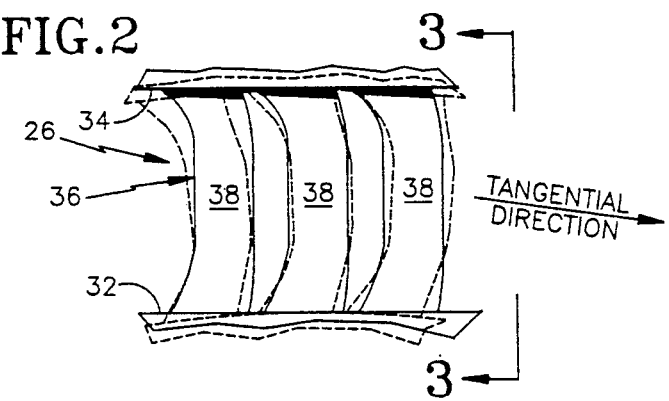
FIG. 2 is a developed view from an upstream location of a portion of a flow directing assembly of a gas turbine engine showing a concealed portion of the rotor stator assembly of FIG. 1.

FIG. 2 shows a portion of the stator assembly of FIG. 1 and in particular shows a portion of the compressor stator vanes 36 which are a portion of the flow directing assembly of the gas turbine engine. The broken line shows the embodiment in an undeveloped view. The solid lines show the embodiment in a developed view.

The compressor stator vane 36 includes the inner wall 32, the outer wall 34, and an array of airfoils, as represented by the airfoil 38, extending between the inner wall and the outer wall. The flowpath for working medium gases extends between the adjacent airfoils. Each airfoil has a convex surface or side such as the suction side surface 42 and a concave surface 44 or side such as the pressure side surface.

Figure 3:
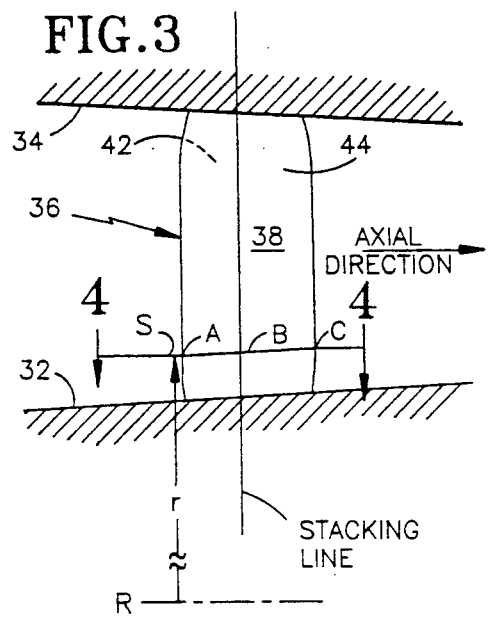
FIG. 3 is a side-elevation view of a compressor taken along the line 2—2 as shown in FIG. 2.

As shown in FIG. 3, the suction surface 42 and the pressure surface 44 of each airfoil are joined together at a leading edge 46 and a trailing edge 48. An imaginary streamline S in the flowpath is adjacent to each airfoil. An imaginary point A associated with each streamline lies on the leading edge of the airfoil along the streamline S. Point A has a radius r about the axis R of the engine. Similarly, an imaginary point B lies on the suction side and an imaginary point C lies on the trailing edge along the streamline S. The three points define a section plane S' (4—4). The plane S' passes through each airfoil and forms a conical airfoil section. The airfoil is defined by a family of these airfoil sections.

Figure 4:
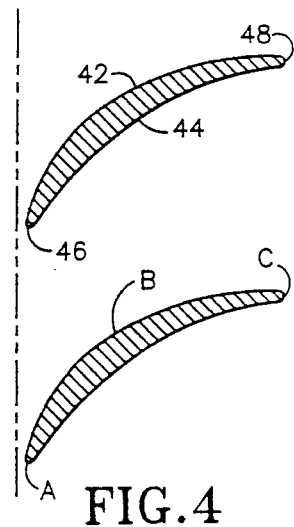
FIG. 4 is a sectional view of two adjacent airfoil sections taken along the line 4—4 of FIG. 3.

FIG. 4 is a sectional view of two adjacent airfoil sections taken along the line 4—4 of FIG. 3.

Figure 5:
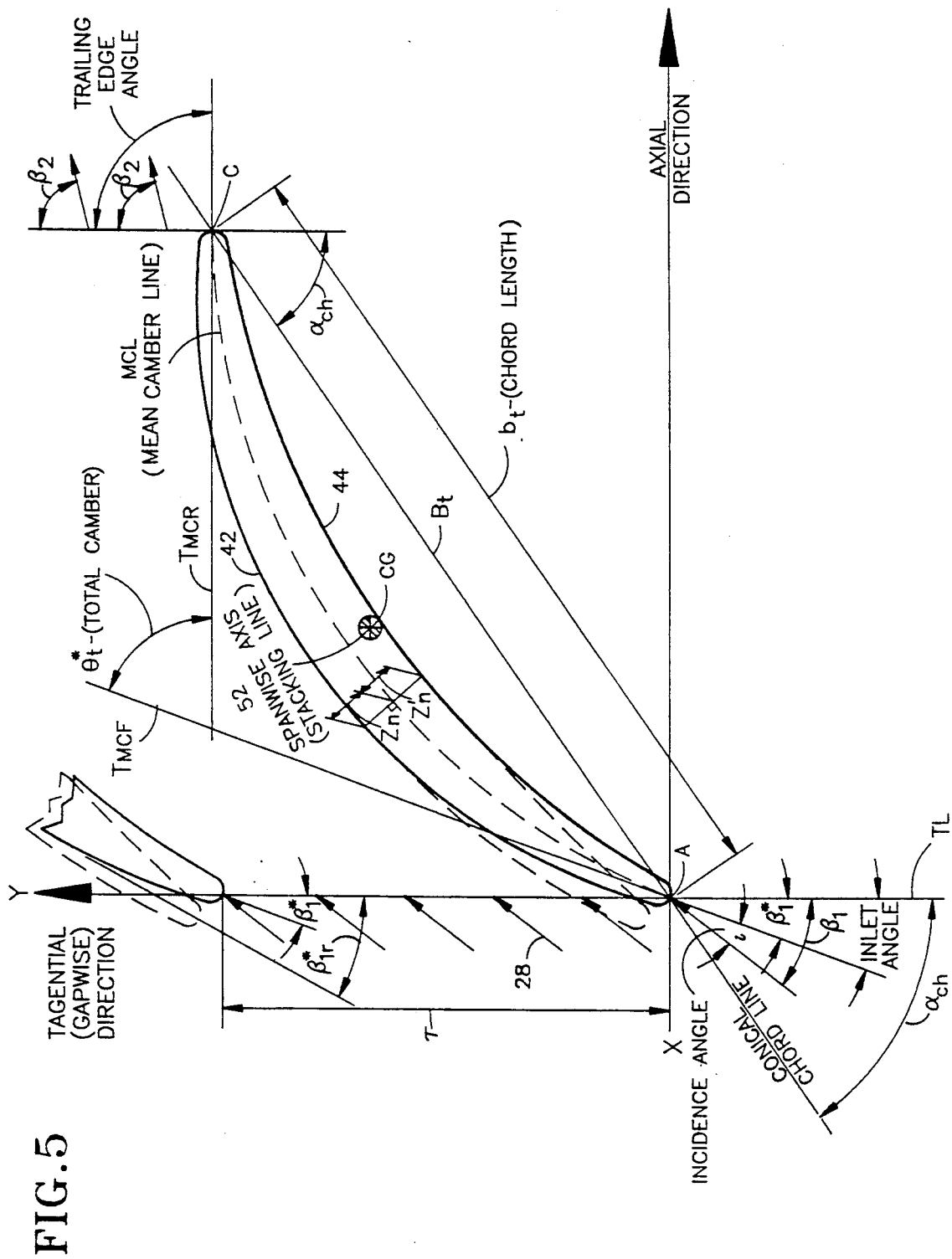
FIG. 5 is an enlarged view of the sectional view of FIG. 4.

FIG. 5 is an enlarged view of the sectional view taken in FIG. 4. A conical chord line $B_t$ is a straight line connecting point A on the leading edge with point C on the trailing edge. The conical chord line $B_t$ has a length $b_t$. A mean camber line MCL connects the point A on the leading edge and the point C on the trailing edge. The suction surface 20 and the pressure surface 22 are spaced a predetermined distance from the mean camber mean line along lines $Z_n'$, measured perpendicular to the mean camber line. The center of gravity CG of the airfoil section is the locating reference for the airfoil in the rotary machine. A spanwise axis 52 or stacking line in the airfoil 38 extends spanwisely through the center of gravity of each airfoil section, locating the airfoil sections with respect to each other in the spanwise direction and chordwisely in the circumferential and axial directions.

A forward tangent line TL, tangent to a circle formed by a radial line passing through the axis R of the engine and through point A, provides a reference axis (y axis) for measuring angles and distances. A plane passing through the axis of rotation R intersects the plane S' at a second reference line, the x axis. $\tau$ is the distance between the airfoil sections measured along the forward tangent line TL. An alpha chord angle, $\alpha_{ch}$, is the angle between the tangent line TL and the conical chord line $B_t$.

The working medium gas flowing along the working medium flowpath 28 approaches the airfoil section at an angle $\beta_1$ to the tangent line TL. The cambered mean line MCL has a tangent line $T_{MCF}$ at the leading (front) edge. The angle between the tangent line $T_{MCF}$ and the tangent line TL is the inlet metal angle $\beta^*_1$. The difference between the inlet metal angle $\beta^*_1$ and the angle of the working medium gases $\beta^*_1$ is the incidence angle i of the working medium gases. As shown in FIG. 5, the incidence angle i is negative.

The working medium gas leaves the airfoil at an angle $\beta_2$ to the rear tangent line TLR. The cambered mean line MCL has a tangent line $T_{MCR}$ at the trailing (rear) edge. A total camber angle $\theta^*_t$ is the angle between the Tangent Line $T_{MCF}$ at the leading edge and the Tangent Line $T_{MCR}$ at the trailing edge. The total camber angle $\theta^*_t$ is the measure of the curve of the cambered mean line and the airfoil section.

FIG. 6 shows a conventional unbowed stator airfoil of the type found in the prior art. The spanwise axis 54 or stacking line of the airfoil 39 is a radial line extending through the axis of the engine. Each of the airfoil sections of the family of airfoil sections is similar to the adjacent spanwise members of the family. The spanwise camber distribution of the airfoil sections provides the proper direction to the flow exiting the airfoil so that it is properly aligned with the downstream array of rotor blades. The inlet metal angle adjacent the inner wall and the outer wall is intended to align the leading edge of the airfoil with the flow exiting the array of rotor blades with no special treatment provided to accommodate for boundary layer effects in the end wall regions.

FIG. 6A is a view corresponding to the view shown in FIG. 6 of an airfoil for a compressor having additional camber adjacent the inner wall and the outer wall. The additional camber provided by decreasing the inlet metal angle accommodates the change in velocity distribution and incidence angle i of the working medium gases due to boundary layer effects in this region. Such airfoils have been proposed for use in advanced engines. The remainder of the airfoil sections remain similar to the airfoil sections of the conventional stator airfoil shown in FIG. 6.

Figure 7:
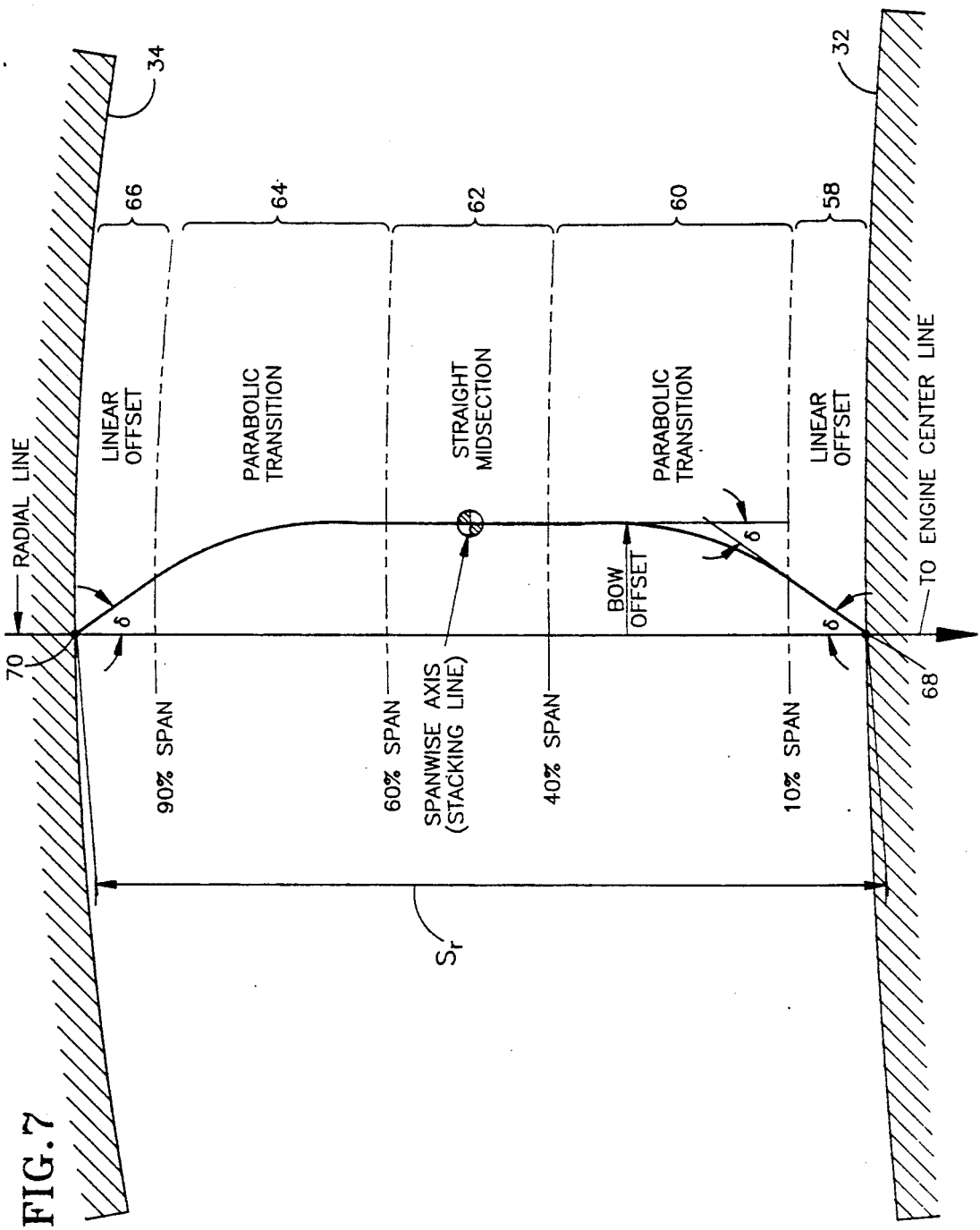
FIG. 7 is a representation of the spanwise axis (stacking line) of an airfoil of the present invention showing the circumferential location of the center of gravity of the airfoil sections of the present invention with respect to a radial spanwise axis (stacking line) for a reference airfoil.

FIG. 7 shows the spanwise axis 52 (stacking line) for the airfoil sections of the airfoil 38 of the present invention compared to a radial spanwise axis 54 for a conventional airfoil 39,39a of the type shown in FIG. 6 or in FIG. 6a where the spanwise axis (stacking line) lies on a radial line. The spanwise axis 52 for the airfoil of the present invention extends through the following regions of the airfoil: an inner end wall region 58; an inner transition region 60; a midspan region 62; an outer transition region 64; and, an outer end wall region 66. The spanwise axis 52 in the midspan region is straight and is parallel to the radial spanwise axis.

The spanwise axis 52 is a straight line angled at an acute angle $\delta$ with respect to the midspan region 62 and to the radial spanwise axis 54 in both the inner end wall region 58 and the outer end wall region 66. Acute angles of forty-five degrees (45°) or less are believed satisfactory. In the present embodiment, the acute angle 8 is approximately thirty degrees (30°).

In the embodiment shown, the spanwise axis 52 is displaced circumferentially in the direction in which the pressure side 44 faces. The midspan region 62 of the spanwise axis is parallel to but not coincident with the radial spanwise axis 54 of airfoil 39a. In an alternate embodiment, the end wall region of the spanwise axis might be displaced circumferentially in the direction the suction surface faces. In such an embodiment, the midspan region of the spanwise axis is parallel to and coincident with the radial spanwise axis.

The spanwise axis 52 in the transition region 60,64 is a curve of higher order (second degree or greater) that fairs the transition line smoothly from the linear (first degree) end wall region 58,66 to the straight (first degree) midspan region 52 in the center of the airfoil. The curve is parabolic in the embodiment shown and may be a higher order equation. The curve is flatter near the midspan region 62 than near the wall region 58,66.

The total span $S_r$ of the airfoil is the distance from the root 68 of the airfoil adjacent the inner end wall 32 to the tip 70 of the airfoil near the outer end wall 34. In the particular embodiment shown, the inner end wall region having a straight spanwise axis 52 (stacking line) extends from the inner wall 32 to approximately the ten percent (10%) span location which is ten percent (10%) of the total span S, from the inner wall to the outer wall. The inner transition region 62 extends from the inner end wall region 58 to approximately the forty percent (40%) span location. As mentioned above, the spanwise axis 52 follows a curve of an equation which is at least a second degree equation, such as a parabolic equation, or may be a higher order equation. The midspan region 62, which is straight and parallel to a radial line, extends from the inner transition region 60 to the sixty percent (60%) span location. The outer transition region 64, which is parabolic as is the inner transition region, extends from the midspan region 62 to approximately the ninety percent (90%) span location. The outer end wall region 66 extends from the outer transition region 64 to the outer wall 34 and contains the spanwise axis 52 which is at an angle of thirty degrees (30°) with respect to a radial line and to the midspan region. As used to describe the boundary between each of the regions, the term "approximately" means the span location may vary by ten percent (10%) of the span of the two adjacent regions which lie on either side of the boundary. For example, the boundary between the transition region and the midspan region may vary by five percent (5%) and between the transition region and the end wall region by four percent (4%).

FIG. 8 is a view similar to the views shown in FIG. 6 and FIG. 6a showing an airfoil 38 of the present invention which is bowed by reason of the angled spanwise axis 52 in the end regions and the radial spanwise axis 52 in the midspan region. The airfoil sections of the bowed airfoil are identical to the airfoils of the reference airfoil 72 shown in FIG. 6a except that the airfoil sections are displaced by reason of the spanwise axis 52 being displaced from a radial line. The exception to this statement is in the end wall regions of the airfoil. The leading edge at the tip 70 of the airfoil in the outer end wall region 66 and the leading edge 46 at the root 68 of the airfoil in the inner end wall region are even more cambered than the unbowed airfoil 72 shown in FIG. 6a.

The broken lines of the adjacent airfoil section shown in FIG. 5 show the leading edge of the reference airfoil of FIG. 6a to illustrate the relationship of the recambered or overcambered airfoil of the present invention at the extremity of the airfoil to the reference airfoil. The reference airfoil is formed on a spanwise axis 54a or stacking line which extends radially from an axis of the engine. The reference airfoil, except for airfoil sections adjacent the inner wall and the outer wall, has the same airfoil sections as the present configuration.

As shown, the airfoil sections of the present invention adjacent the inner wall and the outer wall in the end wall regions are even more cambered than the reference airfoil. It has been found that providing this extra camber provides a more satisfactory incidence angle i in the end wall regions of the airfoil. Thus, the present airfoil is designed taking into account the realization that bowing the airfoil in the end wall region further reduces the incidence angle of the incoming flow and requires overcambering of the airfoil with respect to the reference airfoil sections. This maintains the same incidence angle i with respect to the working medium gases as the reference airfoil section.

As can be seen in FIG. 8, the spanwise axis 52 extends straight over the midspan region and extends straight in the end wall regions and at an acute angle to the spanwise axis in the midspan region so that the pressure surface faces outwardly from the midspan region in the end wall regions of the airfoil.

Depending on the amount of camber placed on the leading edge 46 in the end wall regions of the airfoil, it is possible to affect the angle of the leading edge with respect to the spanwise axis 52 such that the leading edge does not have the same acute angle as does the spanwise axis 52. Nevertheless, at least one half of the chordwise length of the airfoil will extend straight in the midspan region and will extend straight in the end wall regions 58,66 at an acute angle to the midspan region such that the pressure surface 44 in the end wall region 58,66 faces away from the midspan region 62.

FIG. 9 is a schematic representation of a portion of the compression section 12 of FIG. 1 showing the effect of employing airfoils of the present invention on the axial flow streamlines through the compression section of a rotary machine. The orientation of the airfoil sections which results from the bowed stacking line imposes radial forces on the working medium gases which shift the upstream flow approaching the array of airfoils away from the end wall regions. The upstream flow is moved toward the midspan region 62. Thus, as flow passes through the array of airfoils, more working medium gases are flowed through the midspan region and less are flowed through the end wall regions as compared to an unbowed or straight spanwise axis airfoil 39,39a of the type shown in FIG. 6 or FIG. 6a.

The increased flow through the midspan region reduces aerodynamic losses in three ways. The midspan region usually has much lower losses than the end wall regions. Accordingly, increasing the flow which is flowed through the midspan region decreases the flow through the end wall region and will generate less loss than if the incremental increase in flow through the midspan region would flow through the end wall region. Secondly, because the working medium gases flowed through the end wall region of the array of airfoils is reduced, the Mach number in the end wall regions is also reduced. This further reduces losses in the end wall region.

The radial forces imposed by the bowed airfoil on the flow force the working medium gases back toward the original radial distribution as the flow exits the airfoil. This restores the streamlines to their original location as in constructions which do not have bowed airfoils. Thus, the flow is moved inwardly as the flow enters the array of airfoils and moves outwardly as the flow departs from the array of airfoils restoring the original streamline orientation of the working medium gases while avoiding end wall losses in the wall regions of the compressor section adjacent the end walls of the airfoils.

The outward motion of the flow departing the array of airfoils reduces the blade loading in the end wall region further reducing losses in the end wall region. It is believed that in some constructions the loading across the airfoil may be reduced sufficiently in the end wall region to create unseparated flow, avoiding the losses that are associated with the usually separated flow in the end wall regions.

In addition, the straight section 62 of the airfoil has reduced weight in comparison to those constructions in which the midspan region is spanned by an airfoil which is curved or angled. The reduction in weight increases the efficiency of the engine. The straight section of the airfoil in the midspan region reduces the loading across the airfoil in this region relative to curved or angled airfoils. Thus, the reduction in weight is accompanied by no aerodynamic penalty and in fact may decrease the aerodynamic penalty associated with the midspan region as compared to sections in which the airfoil is angled or curved in the midspan region.

Another advantage exists in constructions in which the airfoil is rotatable about a radial axis to change the incidence angle i with respect to the working medium gases. Stators having such variable stators are commonly referred to as "variable stators". The straight midspan region of the airfoil decreases the arc through which midspan region travels as the airfoil is rotated about the radial axis in comparison to airfoils having curved or angled midspan region. Reduced losses result further increasing the efficiency of the airfoil with respect to such curved or angled airfoils. This permits greater rotation angles than are permitted with fully curved or angled airfoils before interference with upstream and downstream arrays of rotor blades. This can provide improved efficiency and stability at starting or low speed conditions than the fully curved airfoils.

Although the invention has been shown and described with respect to detailed embodiments thereof, it should be understood by those skilled in the art that various changes in form and detail thereof may be made without departing from the spirit and the scope of the claimed invention.

We claim:

1. A compressor airfoil for the compression section of a rotary machine having an axis R which comprises:
   a spanwise axis having a plurality of airfoil sections disposed about the spanwise axis, each airfoil section having a pressure surface and a suction surface which form aerodynamic surfaces for the airfoil,
   the airfoil having an inner end wall region, an outer end wall region and a midspan region disposed spanwisely between the inner and outer end wall regions, the spanwise axis extending straight over the midspan region and extending straight in the end wall region and at an acute angle to the spanwise axis in the midspan region so that the pressure surface faces outwardly away from the midspan region in the end wall regions of the airfoil, and so that a first airfoil section in an end wall region has a spanwisely extending portion of the first airfoil section which is displaced circumferentially from the stacking line at another airfoil section by an amount which is the same for said entire spanwisely extending portion of the airfoil section.

2. The airfoil of claim 1 wherein the spanwise axis in the midspan region extends parallel to a radial line extending from the axis 2 of the rotary machine.

3. The airfoil of claim 2 wherein the acute angle between the spanwise axis in the end regions and the spanwise axis in the midspan region is less than forty-five degrees.

4. The airfoil of claim 2 wherein the acute angle between the spanwise axis in the end regions and the spanwise axis in the midspan region is approximately thirty (30) degrees.

5. An airfoil for the compression section of a rotary machine having an axis R which comprises:
   a spanwise axis having a plurality of airfoil sections disposed about the spanwise axis, each airfoil section having a pressure surface and a suction surface which form aerodynamic surfaces for the airfoil, the airfoil having an inner end wall region, an outer end wall region and a midspan region disposed spanwisely between the inner and outer end wall regions, the spanwise axis extending straight over the midspan region parallel to a radial line extending from the axis R and extending straight in the end wall region and at an acute angle to the spanwise axis in the midspan region which is less than forty-five (45) degrees so that the pressure surface faces outwardly away from the midspan region in the end wall regions of the airfoil, wherein the inner end wall region extends from the inner wall to approximately the ten percent span location, the airfoil has an inner transition region which extends from the inner end wall region to approximately the forty percent span location and has a spanwise axis which follows the curve of an equation which is at least a second degree equation, the midspan region extends from the inner transition region to the approximately sixty percent span location, the airfoil has an outer transition region which extends from the midspan region to approximately the ninety percent span location and has a spanwise axis which follows the curve of an equation which is at least a second degree equation, and, the outer end wall region extends from the outer transition region to the outer wall.

6. A compressor vane for the compression section of a rotary machine having an inner wall, an outer wall, an inner end wall region, an outer end wall region and a midspan region disposed spanwisely between the end wall region, the vane further having an airfoil having a leading edge region and a trailing region, a pressure surface and a suction surface which extend spanwisely from the leading edge region to the trailing edge region, the airfoil over at least one half the chordwise extent of the airfoil in the spanwise direction extending straight in the spanwise direction in the midspan region and extending straight in the spanwise direction in the end wall regions and at an acute angle to the midspan region such that the pressure surfaces in the end wall region faces away from the midspan region, and so that a first airfoil section in an end wall region has a spanwisely extending portion of the first airfoil section which is displaced circumferentially from the stacking line at another airfoil section by an amount which is the same for said entire spanwisely extending portion of the airfoil section.

7. The compressor vane of claim 6 wherein the midspan region of the airfoil extends perpendicular to the outer wall and the inner wall of the compressor vane.

8. The compressor vane of claim 7 wherein the acute angle between the spanwise axis in the end wall regions and the spanwise axis in the midspan region is approximately thirty (30) degrees.

9. A rotary machine which has an axis R and an annular flowpath for working medium gases disposed about the axis R, the rotary machine including a compression section through which the flowpath extends and a stator assembly bounding the flowpath having an inner wall, an outer wall spaced radially from the inner wall and an array of airfoils which extend from the inner wall to the outer wall, having at least one airfoil which comprises:

an airfoil having
a first spanwise axis extending in a generally radial direction from the inner wall to the outer wall, the spanwise axis having an inner end wall region, an inner transition region, a midspan region, an outer transition region and an outer end wall region,
a plurality of airfoil sections disposed about the spanwise axis, each airfoil section having a leading edge, a trailing edge, a suction surface extending from the leading edge to the trailing edge and a pressure surface extending from the leading edge to the trailing edge, the airfoil sections being generated from a reference airfoil formed of a family of airfoil sections disposed about a second spanwise axis which lies on a radial line of said machine,
wherein the first spanwise axis is straight in each of the end wall regions and extends circumferentially at an acute angle to the radial direction orienting the pressure surface of the airfoil to face the adjacent wall, wherein the spanwise axis is straight over a portion of the midspan region and extends parallel to the radial direction, and the spanwise axis is substantially straight in the transition region being formed of a curve which is flatter near the midspan region than near the end wall region; and
wherein the inlet metal angle of a plurality of airfoil sections in each of the end wall regions is smaller than the inlet metal angle of associated airfoil sections of a reference airfoil having a radial spanwise axis to maintain the same incidence angle with respect to the working medium gases as the reference airfoil section.

10. The rotary machine of claim 9 wherein the spanwise axis is parabolic in the transition regions.

11. The rotary machine of claim 10 wherein the inner end wall region extends from the inner wall to approximately the ten percent span location, the inner transition region extends from the inner end wall region to approximately the forty percent span location and has a spanwise axis which follows the curve of an equation which is at least a second degree equation, the midspan region extends from the inner transition region to approximately the sixty percent span location, the outer transition region extends from the midspan region to approximately the ninety percent span location and has a spanwise axis which follows the curve of an equation which is at least a second degree equation and the outer end wall region extends from the outer transition region to the outer wall.

12. The airfoil of claim 5 wherein the acute angle between the spanwise axis in the end regions and the spanwise axis in the end region is approximately thirty (30) degrees.

* * * * *